Jan. 1, 1963 E. H. LANHAM 3,071,655

TIME DIVISION JUNCTION CIRCUIT FOR A TRANSMISSION LINE

Filed Nov. 9, 1959 4 Sheets-Sheet 1

Inventor
EDWARD H. LANHAM
By Robert B. Harmon
Attorney

TIME DIVISION JUNCTION CIRCUIT FOR A TRANSMISSION LINE

Filed Nov. 9, 1959

Inventor
EDWARD H. LANHAM
By Robert B. Harmon
Attorney

TIME DIVISION JUNCTION CIRCUIT FOR A TRANSMISSION LINE

Filed Nov. 9, 1959 4 Sheets-Sheet 3

FROM TWO WIRE CKT.

Inventor
EDWARD H. LANHAM
By Robert B. Harmon
Attorney

Inventor
EDWARD H. LANHAM
By Robert B. Harmon
Attorney

United States Patent Office 3,071,655
Patented Jan. 1, 1963

3,071,655

TIME DIVISION JUNCTION CIRCUIT FOR A TRANSMISSION LINE

Edward H. Lanham, Montreal, Quebec, Canada, assignor to Northern Electric Company, Limited, Montreal, Quebec, Canada, a corporation of Canada
Filed Nov. 9, 1959, Ser. No. 851,654
3 Claims. (Cl. 179—170)

This invention relates to telephone transmission circuits and more particularly to a means of connecting two-wire voice frequency telephone circuits to four-wire voice frequency telephone circuits by means of simple transformers and without the necessity of using expensive and difficult-to-balance hybrid coils, resistance hybrids or balancing networks.

In bi-directional carrier and telephone transmission lines, where it is necessary to connect two sections of the line through a junction circuit, it is common practice to provide two oppositely-directed channels, connected to and extending between the two sections, having incorporated therein a circuit arranged to prevent interaction between the two channels. A well known means for attaining this purpose is the hybrid coil circuit. Such hybrid coil circuits require expensive accessories, such as repeating coils and balancing networks, the latter requiring that the circuit be of a precision nature in character.

An object of this invention is to provide an improved two-channel junction circuit adapted to connect two sections of a bi-directional telephone transmission line through a four-wire junction circuit, without interaction between the channels.

Another object of this invention is to provide a two-channel bi-directional junction circuit, having the foregoing characteristics, which is economical to manufacture and to operate.

A still further object of this invention is to provide a two-channel bi-directional junction circuit, having the foregoing characteristics, adapted to be applied to various types of communication transmission lines.

Another object of this invention is to provide a two-channel bi-directional junction circuit having the foregoing characteristics, which does not require precision adjustments.

A further object of this invention is to provide a bi-directional junction circuit, having the foregoing characteristics which is small in size, light in weight, rugged, and which has long expected life, simple power requirements and zero warm-up time.

Another object of this invention is to provide a bi-directional junction circuit, having the foregoing characteristics, in which the junction between a two-wire voice frequency telephone transmission circuit and a four-wire bi-directional circuit is obtained without requiring balancing networks.

These and other objects are attained, in one embodiment of the invention, by providing a junction circuit having two channels connected to and extending between the two sections of a telephone transmission line, each channel containing a four-point, four-arm switch circuit with semiconductor elements incorporated in each of the arms, the diodes having a direct current applied thereto in order to provide a static bias and with the poling of the diodes of one bridge circuit in one channel opposite to those of the other channel, and an oscillator, having interruptions above the audible range, connected to the switch circuits and so arranged to change alternately the poling of the diodes in the switch circuits, the biasing being against transmission in one direction only in the absence of a signal from the oscillator but being such as to render the switch circuits alternately conducting and non-conducting in the presence of a signal.

A better understanding of the invention may be had by referring to the following description, taken in conjunction with the accompanying drawings, in which like numbers refer to like parts, in which.

Figure 1:
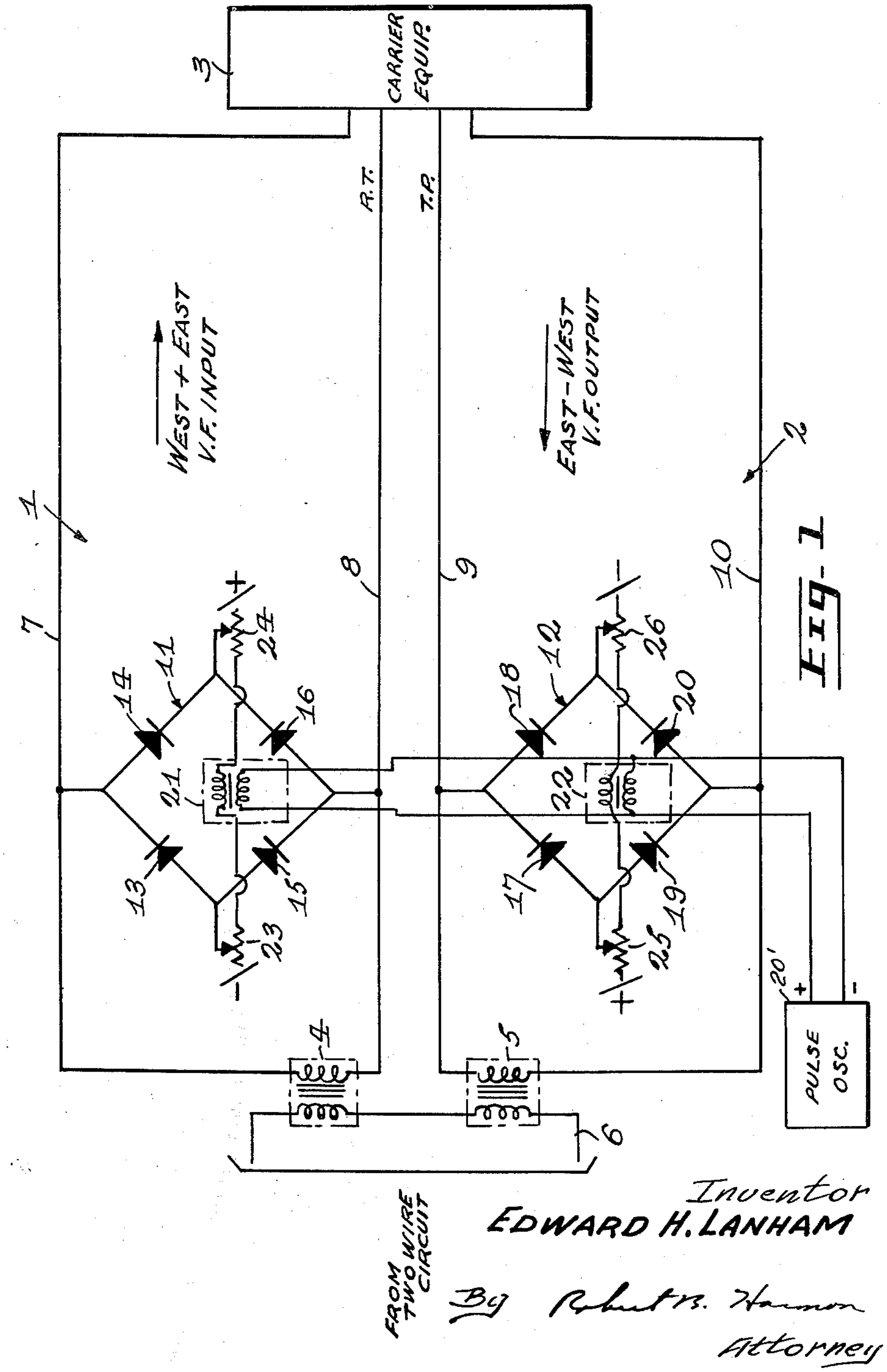
FIG. 1 illustrates a double-coil four-wire junction circuit, adapted to terminate a bi-directional transmission telephone line with a carrier terminal, in which the invention is represented.

Considering the drawings, there are shown in FIG. 1 channels 1 and 2 connected to the carrier equipment 3 and, by means of repeating coils 4, 5 to the outgoing line 6. Connected between the conductors 7, 8 and 9, 10 respectively are four-point, four-arm diode switches 11 and 12, each being equipped respectively with semiconductor diodes 13, 14, 15, 16 and 17, 18, 19, 20. There is shown in this figure a high-frequency pulse oscillator 20' with coupling coils 21, 22, having a frequency for example about 20,000 cycles, being connected through potentiometers 23, 24 and 25, 26 to a pair of junction points of the diode switches 11 and 12.

Figure 2:
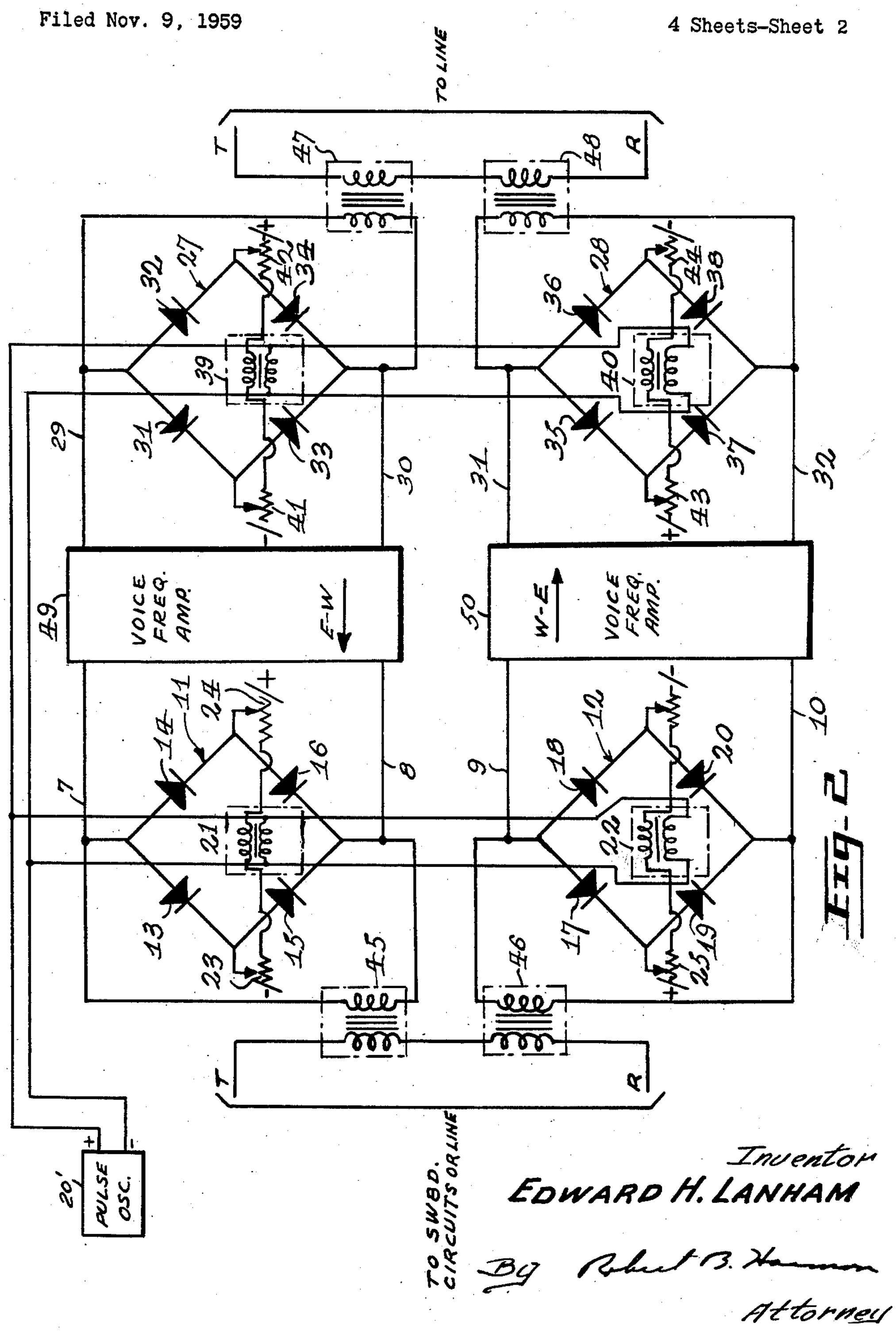
FIG. 2 illustrates a double-coil four-wire junction circuit similar to the circuit shown in FIG. 1, except that it is adapted to terminate telephone repeaters.

The junction circuit illustrated in FIG. 2 is similar to the junction circuit shown in FIG. 1 except for the addition of diode switches 27 and 28, which are the same as diode switches 11 and 12, respectively connected between conductors 29, 30 and 31, 32 and which contain the diodes 31, 32, 33, 34 and 35, 36, 37, 38, oscillator 20' having also coupling coils 39, 40 and adjusting potentiometers 41, 42 and 43, 44. Channels 1 and 2 are connected to the two sections of the transmission line by repeating coils 45, 46 and 47, 48, repeating-amplifying elements 49 and 50 being connected between the diode switches 11, 27 and 12, 28.

Figure 3:
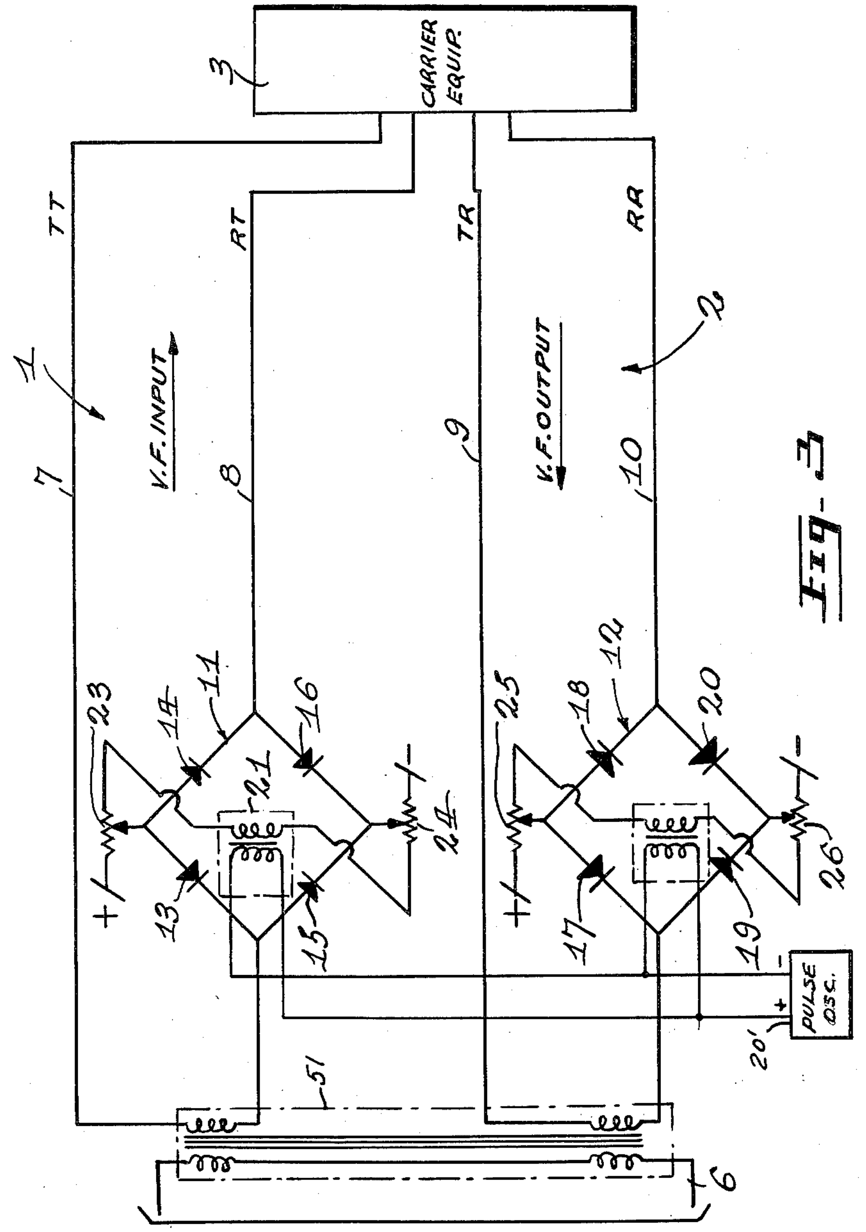
FIG. 3 illustrates a four-wire junction circuit similar to the circuit shown in FIG. 1, except that a single connecting coil is employed.
Figure 4:
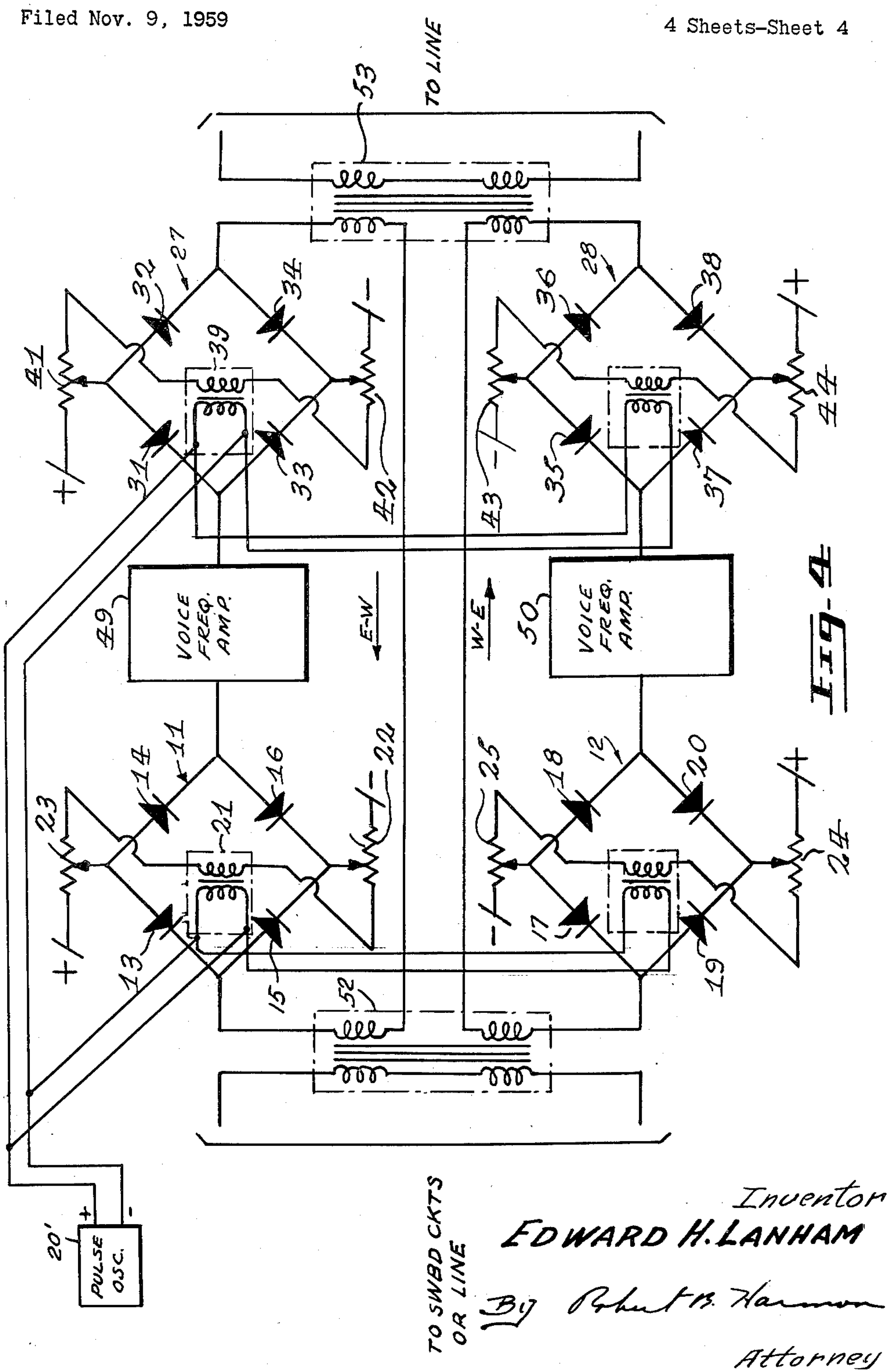
FIG. 4 illustrates a four-wire junction circuit similar to the circuit shown in FIG. 2, except that a single connecting coil is employed.

The junction circuits shown in FIGS. 3 and 4 are similar to the junction circuits illustrated in FIGS. 1 and 2 respectively, except that the diode switches 11, 12, 27 and 28 are connected in series in channels 1 and 2 and a single coil 51 as in FIG. 3 and single coils 52, 53 as in FIG. 4 are employed.

In the operation of the junction circuit, as shown in FIG. 1, a direct current biasing potential is applied to the diodes 13, 14, 15, 16 and 17, 18, 19, 20, the magnitude of this biasing potential and of the output of the oscillator 20' being adjusted by potentiometers 23, 24 and 25, 26 so that the diode switches remain static during the absence of a signal, but become alternately, conducting and non-conducting due to the oscillator signal potential aiding or opposing the biasing potential as set forth. The direct current bias is applied so that, in the event of oscillator failure, one channel would conduct wave transmission while the other channel would remain short-circuited, thus preventing local oscillations being set up in the junction. In order to ensure stability of the junction circuit, the wave form of oscillator 20' should have a square top.

Assume that a signal is received from the West-East direction, and is coupled, by means of repeating coils 4 and 5 to channels 1 and 2 respectively. During the positive and negative half cycles derived from the oscillator 20' and coupling coils 21 and 22, the diode switches 11 and 12 become alternately conducting and non-conducting, depending on the polarity of the signal presented to the switch circuits. Therefore, when diode switches 11 and 12 are conducting and non-conducting respectively, the portion of the signal presented to channel 1 will be short circuited through diode switch 11, while that portion presented to channel 2 will pass therethrough to the carrier equipment.

The operation of the junction circuit shown in FIG. 2, is the same as that described for the junction circuit illustrated in FIG. 1, the use of the additional diode switches 27, 28 permitting a high gain to be derived from repeating-amplifying elements 49 and 50.

In the junction circuits illustrated in FIGS. 3 and 4, the diode switches 11 and 12 are connected in the channels 1 and 2, in series, which permits the employment of a single repeating coil 51. In the operation of the junction circuit shown in FIG. 3, assume that a signal is received from the West-East direction and is coupled by repeating coil 51 to channels 1 and 2.

During the negative half cycle of the common oscillator 20′, semiconductor diodes 17, 18, 19, 20 are biased in the conducting condition and thus diode switch 12, in series with channel 2, is conducting and channel 2 is closed permitting transmission therethrough from the carrier equipment 3 to the two-wire line 6 through repeating coil 51. At the same instant (the common oscillator 20′ being on the negative half cycle), semiconductor diodes 13, 14, 15, 16 are biased in the non-conducting condition and thus diode switch 11 in series with channel 1 is open, preventing transmission therethrough from the two-wire line 6 to the carrier equipment 3.

The output of the pulse oscillator 20′ should be of sufficient magnitude to overcome the idle condition direct current bias on the diode switches and is connected thereto in such manner that when the diode switch in one channel is conducting that in the opposite channel is non-conducting.

What is claimed is:

1. In a telephone voice frequency transmission system which includes a two-wire and a four-wire bi-directional transmission line, a means of connecting the four-wire transmission line to the two-wire two-way transmission line, consisting of a pair of two-wire, unidirectional, oppositely-directed channel circuits, connected to the four-wire transmission line, coupling means for coupling the unidirectional channel circuits to the two-wire transmission line; a pair of switches each comprising a four-point four-arm bridge circuit having a semiconductor diode connected in each of the four arms, one of the switches connected across each individual channel circuit at a pair of oppositely disposed junction points of the switch; a direct-current biasing source; a supersonic square-wave oscillator coupled in parallel relation with the biasing source and applying a biasing potential greater than that of the direct-current biasing source; the parallel combination of biasing source and coupled oscillator connected across the remaining pair of oppositely-disposed junction points of each switch; individual adjusting means connected to each switch; the semiconductor diodes in the respective switches are so poled that when one switch is conducting the other is non-conducting.

2. In a telephone transmission system as defined in claim 1 in which said coupling means comprises a first and second transformer having primary windings connected in series across the two-wire, two-way transmission line and having the secondary windings of the first and second transformer connected individually to the channel circuits.

3. In a two-way, two-wire telephone voice frequency transmission line, a four-wire bi-directional circuit consisting of a pair of two-wire unidirectional, oppositely-directed channel circuits interposed between two sections of the two-wire, two-way transmission line, coupling means for coupling the four-wire circuit to the two sections of the two-wire transmission line; a pair of four-arm four-point switches connected in shunt relation in each channel circuit at pairs of oppositely-disposed junction points on the switches, each arm having connected therein a semiconductor diode; an amplifier disposed in each channel, connected between the pair of switches therein; a biasing source common to both pairs of switches; a supersonic square-wave oscillator coupled in parallel relation with the biasing source; the parallel combination of biasing source and coupled oscillator connected across the remaining pair of oppositely-disposed junction points of each switch through adjusting means individual to each switch.

References Cited in the file of this patent

UNITED STATES PATENTS

| | | |
|---|---|---|
| 2,166,775 | Varley | July 18, 1939 |
| 2,439,651 | Dome | Apr. 13, 1948 |
| 2,657,280 | Skolnikoff | Oct. 27, 1953 |
| 2,763,840 | Pfleger | Sept. 18, 1956 |
| 2,851,617 | Walker | Sept. 9, 1958 |
| 2,920,291 | Brundage | Jan. 5, 1960 |

FOREIGN PATENTS

| | | |
|---|---|---|
| 182,853 | Great Britain | July 10, 1922 |
| 351,958 | Germany | Apr. 18, 1922 |
| 370,140 | Italy | Apr. 8, 1939 |
| 492,760 | Germany | Feb. 26, 1930 |